United States Patent
Lee et al.

(10) Patent No.: US 12,421,414 B2
(45) Date of Patent: Sep. 23, 2025

(54) OPTICAL FILM, COMPOSITION FOR FORMING COATING LAYER, AND ELECTRONIC DEVICE

(71) Applicant: LG CHEM, LTD., Seoul (KR)

(72) Inventors: Hanna Lee, Daejeon (KR); Soonhwa Jung, Daejeon (KR); Chulsuk Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 18/570,612

(22) PCT Filed: Mar. 3, 2023

(86) PCT No.: PCT/KR2023/002978
§ 371 (c)(1),
(2) Date: Dec. 14, 2023

(87) PCT Pub. No.: WO2023/167562
PCT Pub. Date: Sep. 7, 2023

(65) Prior Publication Data
US 2024/0279501 A1    Aug. 22, 2024

(30) Foreign Application Priority Data

Mar. 3, 2022 (KR) .......... 10-2022-0027487
Mar. 3, 2022 (KR) .......... 10-2022-0027488

(51) Int. Cl.
| | | |
|---|---|---|
| C09D 125/12 | (2006.01) | |
| C08K 5/00 | (2006.01) | |
| C09D 7/41 | (2018.01) | |
| G02B 5/22 | (2006.01) | |
| H04N 23/20 | (2023.01) | |

(52) U.S. Cl.
CPC ............ *C09D 125/12* (2013.01); *C09D 7/41* (2018.01); *G02B 5/223* (2013.01); *H04N 23/20* (2023.01); *C08K 5/0041* (2013.01)

(58) Field of Classification Search
CPC ........ C09D 125/12; C09D 7/41; G02B 5/223; G02B 5/208; G02B 5/28; G02B 5/22; G02B 1/04; G02B 1/10; G02B 5/20; G02B 5/26; H04N 23/20; C08K 5/0041
See application file for complete search history.

(56) References Cited

U.S. PATENT DOCUMENTS

| | | | | |
|---|---|---|---|---|
| 11,726,246 B2 * | 8/2023 | Yun | ......... | G02B 5/305 359/485.03 |
| 2006/0051586 A1 | 3/2006 | Park et al. | | |
| 2010/0177397 A1 | 7/2010 | Kamiyama et al. | | |
| 2011/0012073 A1 | 1/2011 | Koo et al. | | |
| 2014/0071530 A1 | 3/2014 | Park et al. | | |
| 2016/0077255 A1 | 3/2016 | Singh et al. | | |
| 2016/0231482 A1 | 8/2016 | Hasegawa et al. | | |
| 2020/0183065 A1 * | 6/2020 | Haag | ................. | G02F 1/133615 |
| 2024/0168210 A1 * | 5/2024 | Le | ......... | G02B 5/3041 |
| 2024/0377556 A1 * | 11/2024 | Gonta | ...... | G02B 1/11 |
| 2025/0137927 A1 * | 5/2025 | Xu | ...... | G01N 21/4738 |

FOREIGN PATENT DOCUMENTS

| | | | | |
|---|---|---|---|---|
| CN | 110573927 B | * | 3/2022 | ........ G02F 1/13475 |
| CN | 116615675 A | * | 8/2023 | ........... G02B 5/305 |
| JP | H11-191691 A | | 7/1999 | |
| JP | 2003-344659 A | | 12/2003 | |
| JP | 2004-030564 A | | 1/2004 | |
| JP | 2007-521627 A | | 8/2007 | |
| JP | 2016-183312 A | | 10/2016 | |
| JP | 2020-177147 A | | 10/2020 | |
| KR | 10-2005-0088564 A | | 9/2005 | |
| KR | 10-2009-0022692 A | | 3/2009 | |
| KR | 10-1143761 B1 | | 5/2012 | |
| KR | 10-2012-0074114 A | | 7/2012 | |
| KR | 10-2013-0037165 A | | 4/2013 | |
| KR | 10-1374366 B1 | | 3/2014 | |
| KR | 10-2014-0049941 A | | 4/2014 | |
| KR | 10-1418755 B1 | | 7/2014 | |
| KR | 10-2016-0113660 A | | 9/2016 | |
| KR | 10-2018-0023655 A | | 3/2018 | |
| KR | 10-2018-0101761 A | | 9/2018 | |
| KR | 10-1959712 B1 | | 3/2019 | |
| KR | 10-2020-0076134 A | | 6/2020 | |
| KR | 10-2126682 B1 | | 6/2020 | |
| KR | 10-2021-0120900 A | | 10/2021 | |
| WO | 2008-020578 A1 | | 2/2008 | |
| WO | 2009-016846 A1 | | 2/2009 | |
| WO | WO-2017179940 A1 * | | 10/2017 | ............... G02B 5/30 |
| WO | WO-2019077547 A1 * | | 4/2019 | .......... G02B 27/283 |
| WO | WO-2025074904 A1 * | | 4/2025 | ............... G02B 1/11 |

OTHER PUBLICATIONS

English Translation CN 116615675 (Year: 2023).*
English Translation CN110573927 (Year: 2022).*
International Search Report for PCT/KR2023/002978 issued on Jun. 1, 2023, 4 pages (with English translation).

* cited by examiner

*Primary Examiner* — Fernando Alcon
(74) *Attorney, Agent, or Firm* — ROTHWELL, FIGG, ERNST & MANBECK, P.C.

(57) ABSTRACT

The present disclosure relates to an optical film, a composition for forming coating layer, and an electronic device, which have excellent light absorption performance to near infrared ray at a wavelength of 750 nm or more and 1500 nm or less, and have excellent light resistance and moisture resistance, thereby capable of realizing excellent light absorption performance even when exposed to severe conditions.

19 Claims, No Drawings

OPTICAL FILM, COMPOSITION FOR FORMING COATING LAYER, AND ELECTRONIC DEVICE

TECHNICAL FIELD

Cross-Reference to Related Application(s)

This application is a 35 U.S.C. § 371 National Phase Entry Application from PCT/KR2023/002978, filed on Mar. 3, 2023, which claims the benefit of Korean Patent Application No. 10-2022-0027487 filed on Mar. 3, 2022 and Korean Patent Application No. 10-2022-0027488 filed on Mar. 3, 2022 in the Korean Intellectual Property Office, the disclosures of which are incorporated herein by reference in their entirety.

The present disclosure relates to an optical film, a composition for forming coating layer, and an electronic device.

BACKGROUND

Virtual reality (VR) refers to a specific environment, condition, or the technology itself, that looks similar to the reality created by artificial technologies such as computers, but differs from reality.

Also, augmented reality (AR) refers to a technology that combines virtual objects or information with the real environment to make it look like objects existing in the original environment.

Mixed Reality (MR) or hybrid reality refers the merging of the virtual worlds and real worlds to create new environments or new information. In particular, when referring to real-time interactions between objects present in the real world and virtual space, it is called mixed reality At this time, the created virtual environment, condition or the like stimulates the user's five senses, and enables spatial and temporal experiences similar to those of the real world, thereby freely enter and leave the boundary between reality and imagination. In addition, users can not only simply immerse in such environments, but also interact with what is realized in such environments, such as adding operations and instructions using devices existing in the real space.

That is, based on the real world, the user can interact with virtual objects to feel an enhanced reality sense, recognize the real environment in which the user is located, and also recognize virtual information expressed on the real image.

In such technical fields, pupil recognition sensors are used to match virtual reality images to the real world gazed by the user.

The optical method, which is one of the tracking methods, is a method in which an infrared LED is attached to a pre-measured position and detected by a camera. Similar to the red-eye phenomenon that occurs when the pupil reflects light when taking a picture, the pupil detected by the infrared LED is photographed with a camera, and expresses a foveal vision as a coordinate through a designed algorithm. Therefore, by effectively blocking an external infrared region except for an infrared LED for detecting a pupil, errors in the execution of Augmented Reality can be minimized.

Therefore, in order to apply to Augmented Reality (AR) and minimize the error of the pupil recognition sensor, there is a need for research into an optical film that effectively blocks near-infrared rays flowing in from the outside.

BRIEF SUMMARY

Technical Problem

The present disclosure is to provide an optical film, a composition for forming coating layer, and an electronic device, which have excellent light absorption performance to near infrared ray at a wavelength of 750 nm or more and 1500 nm or less, and are excellent in light resistance and moisture resistance, thereby capable of realizing excellent light absorption performance even when exposed to severe conditions.

Technical Solution

Provided herein is an optical film, comprising: a substrate; and a coating layer formed on the substrate, wherein the coating layer comprises a vinyl cyan compound-aromatic compound copolymer and a dye having a maximum absorption wavelength of 750 nm or more and 1500 nm or less, wherein the optical film has an initial average transmittance (T0) of 30% or more in the wavelength range of 800 nm to 1000 nm, and wherein an average transmittance change rate calculated by the following Mathematical Formula 1 is 18% or less:

Average transmittance change rate=[(Average transmittance($T1$)possessed by the optical film in a wavelength range of 800 nm to 1000 nm after exposure to a wavelength range of 300 nm to 400 nm for 15 to 30 hours–Initial average transmittance($T0$)possessed by the optical film in a wavelength range of 800 nm to 1000 nm)/ $T0$]*100.  [Mathematical Formula 1]

Also provided herein is an electronic device comprising the above-mentioned optical film.

Further provided herein is a composition for forming coating layer, comprising: a vinyl cyan compound-aromatic compound copolymer, and a dye having a maximum absorption wavelength of 750 nm or more and 1500 nm or less, wherein the vinyl cyan compound-aromatic vinyl compound copolymer has a weight average molecular weight of 10,000 g/mol or more and 200,000 g/mol or less, and wherein the vinyl cyan compound-aromatic vinyl compound copolymer contains 10 parts by weight or more and 50 parts by weight or less of a repeating unit derived from the vinyl cyan compound based on 100 parts by weight of the vinyl cyan compound-aromatic vinyl compound copolymer.

Hereinafter, an optical film, a composition for forming coating layer, and an electronic device according to specific embodiments of the present disclosure will be described in more detail.

DETAILED DESCRIPTION

As used herein, "high temperature" may mean a temperature of 60° C. or higher. For example, the high temperature may mean a temperature of 65° C. or more, 70° C. or more, 75° C. or more, 80° C. or more, 85° C. or more or 90° C. or more, and the upper limit is not particularly limited, but for example, it may be 110° C. or less, 105° C. or less, 100° C. or less, 95° C. or less, 90° C. or less, 85° C. or less, or 80° C. or less. When temperature affects the characteristics of a material, article, or each component, the temperature condition under which the characteristics are measured or described may mean normal temperature (e.g., a temperature range of about 15 to 30° C. where no temperature decrease or heating is performed), unless otherwise stated.

Further, as used herein, "high humidity" may mean a relative humidity of 80% or more. For example, the high humidity condition may mean a condition that satisfies a relative humidity of 85% or more, 90% or more, or 95% or more. When humidity affects the characteristics of a material, object, or each component, unless otherwise specified, the humidity condition under which the characteristics are measured or described may be a case where the relative humidity is lower than the high humidity condition, for example, a relative humidity condition in the range of 15 or more and less than 80%. Specifically, it can refer to relative humidity conditions whose lower limit is 20% or more, 25% or more, 30% or more, 35% or more, or 40% or more, and upper limit is 75% or less, 70% or less, 65% or less, or 60% or less.

Further, as used herein, the high temperature/high humidity conditions may refer to environmental conditions that satisfy one or more of the above-mentioned high temperature conditions and high humidity conditions.

Unless expressly stated otherwise herein, the technical terms used herein are only for reference to specific embodiments and is not intended to limit the present disclosure.

The singular forms "a", "an", and "the" used herein include plural references unless the context clearly dictates otherwise.

The term "including" or "comprising" used herein specifies a specific feature, region, integer, step, action, element and/or component, but does not exclude the presence or addition of a different specific feature, region, integer, step, action, element, component and/or group.

As used herein, the weight average molecular weight means a weight average molecular weight (unit: g/mol) in terms of polystyrene measured by a GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions include a temperature of 25° C., tetrahydrofuran (THF) and a flow rate of 1 mL/min.

According to one embodiment of the disclosure, there is provided an optical film, comprising: a substrate; and a coating layer formed on the substrate, wherein the coating layer comprises a vinyl cyan compound-aromatic compound copolymer and a dye having a maximum absorption wavelength of 750 nm or more and 1500 nm or less, wherein the optical film has an initial average transmittance (T0) of 30% or more in the wavelength range of 800 nm to 1000 nm, and wherein an average transmittance change rate calculated by the following Mathematical Formula 1 is 18% or less:

Average transmittance change rate=[(Average transmittance($T1$)possessed by the optical film in a wavelength range of 800 nm to 1000 nm after exposure to a wavelength range of 300 nm to 400 nm for 15 to 30 hours−Initial average transmittance($T0$)possessed by the optical film in a wavelength range of 800 nm to 1000 nm)/ $T0$]*100.   [Mathematical Formula 1]

The dye having a maximum absorption wavelength of 750 nm or more and 1500 nm or less has weak light stability. Thus, conventionally, in the case of an optical film including the same, there is a problem that the light resistance is deteriorated and the light absorption performance of the dye is deteriorated.

Therefore, the present inventors have conducted research on an optical film that has excellent light resistance and moisture resistance even when used under severe conditions, and that can realize excellent light absorption in a wavelength range of 750 nm or more and 1500 nm or less, and found that in the case of an optical film including a dye having a maximum absorption wavelength of 750 nm or more and 1500 nm or less together with the vinyl cyan compound-aromatic compound copolymer, the vinyl cyan compound-aromatic compound copolymer has excellent oxidative stability against heat and light and thus, generates less reactive species that affect the stability of the dye, so that by increasing the stability of the dye, the finally manufactured optical film has excellent light resistance and moisture resistance even when used under severe conditions, and can realize excellent light absorption in a wavelength range of 750 nm or more and 1500 nm or less. The present disclosure has been completed on the basis of this finding.

Specifically, the average transmittance change rate calculated by the following Mathematical Formula 1 may be 18% or less:

Average transmittance change rate=[(Average transmittance($T1$)possessed by the optical film in a wavelength range of 800 nm to 1000 nm after exposure to a wavelength range of 300 nm to 400 nm for 15 to 30 hours−Initial average transmittance($T0$)possessed by the optical film in a wavelength range of 800 nm to 1000 nm)/ $T0$]*100.   [Mathematical Formula 1]

The average transmittance is a value measured for an optical film having a thickness of 20 μm or more and 250 μm or less, and the specific measurement method is not particularly limited, but it can be measured using a spectrophotometer such as Shimadzu's SolidSpec-3700.

Specifically, the optical film may have an average transmittance change rate calculated by Mathematical Formula 1, of 15% or less, 10% or less, 5% or less, 2% or less, 0.01% or more, 0.1% or more, 0.5% or more, or 0.01% or more 10% or less, 0.01% or more 5% or less, 0.01% or more 2% or less, 0.1% or more 10% or less, 0.1% or more 5% or less, 0.1% or more 2% or less, 0.5% or more 10% or less, 0.5% or more 5% or less, 0.5% or more 2% or less, which fall under 18% or less.

As the average transmittance change rate calculated by Mathematical Formula 1 is 10% or less, it is possible to provide an optical film that has excellent light resistance and thus does not deteriorate light absorption performance to near infrared ray in the wavelength range of 750 nm or more and 1500 nm or less even under severe conditions, realizes excellent light absorption property and is suitable for application to Augmented Reality (AR), and the like.

In Mathematical Formula 1, the initial average transmittance may mean an optical film that has not been separately treated after manufacture.

That is, in Mathematical Formula 1, the initial average transmittance may be 30% or more, 40% or more, 45% or more, 60% or less, 56% or less, 30% or more 60% or less, 40% or more and 60% or less, 45% or more and 60% or less, 30% or more and 56% or less, 40% or more and 56% or less, 45% or more and 56% or less.

As the initial average transmittance of the optical film is 30% or more and 60% or less, it is possible to provide an optical film that has excellent light absorption to near infrared ray in the wavelength range of 750 nm or more and 1500 nm or less, and thus is suitable for application to Augmented Reality (AR), and the like.

Further, in Mathematical Formula 1, the average transmittance after exposure to ultraviolet rays having a wavelength of 100 nm to 400 nm or 300 nm to 400 nm for 15 hours or more and 30 hours or less may mean an average transmittance in the wavelength region of 800 nm or more and 1000 nm or less, which is measured after exposing the optical film of the one embodiment to a maximum light intensity of 0.10 to 1.00 W/cm$^2$, or 0.68 W/cm$^2$ at 300 nm to 400 nm, or 340 nm for 15 to 30 hours, or 24 hours using a Q-Lab QUV device. At this time, a QUV device (Q-Lab) or the like can be used.

The average transmittance (T1) possessed by the optical film in a wavelength range of 800 nm to 1000 nm after exposure to a wavelength range of 300 nm to 400 nm for 15 to 30 hours may be 30% or more and 65% or less.

Specifically, the average transmittance (T1) possessed by the optical film in a wavelength range of 800 nm to 1000 nm after exposure to a wavelength range of 300 nm to 400 nm for 15 to 30 hours may be 30% or more, 40% or more, 45% or more, 60% or less, 56% or less, 30% or more and 60% or less, 40% or more and 60% or less, 45% or more and 60% or less, 30% or more and 56% or less, 40% or more and 56% or less, 45% or more and 56% or less.

As the average transmittance (T1) possessed by the optical film in a wavelength range of 800 nm to 1000 nm after exposure to a wavelength range of 300 nm to 400 nm for 15 to 30 hours is 30% or more and 60% or less, it is possible to provide an optical film that has excellent light resistance and realizes excellent light absorption to near infrared ray in the wavelength range of 750 nm or more and 1500 nm or less even under severe conditions, and thus is suitable for application to Augmented Reality (AR), and the like.

Meanwhile, the optical film may have an initial average transmittance (T0) of 30% or more, or 30% or more and 60% or less in a wavelength range of 800 nm to 1000 nm.

The average transmittance is a value measured for an optical film having a thickness of 20 μm or more and 250 μm or less, and the specific measurement method is not particularly limited, but it can be measured using a spectrophotometer such as Shimadzu's SolidSpec-3700.

Specifically, the optical film may have an average transmittance at a wavelength of 800 nm or more and 1000 nm or less, of 30% or more, 40% or more, 45% or more, 60% or less, 56% or less, 30% or more and 60% or less, 40% or more and 60% or less, 45% or more and 60% or less, 30% or more and 56% or less, 40% or more and 56% or less, 45% or more and 56% or less.

As the optical film has an average transmittance at a wavelength of 800 nm or more and 1000 nm or less of 30% or more and 60% or less, it is possible to provide an optical film that has excellent light absorption to near infrared ray in the wavelength range of 750 nm or more and 1500 nm or less, and thus is suitable for application to Augmented Reality (AR), and the like.

Meanwhile, the optical film may have the average transmittance change rate calculated by the following Mathematical Formula 2 of 10% or less:

Average transmittance change rate=[(Average transmittance(T2)possessed by the optical film in a wavelength range of 800 nm to 1000 nm after exposure to high temperature and high humidity conditions−Initial average transmittance(T0) possessed by the optical film in a wavelength range of 800 nm to 1000 nm)/T0]*100     [Mathematical Formula 2]

Wherein, the exposure to high temperature and high humidity conditions means exposure to a temperature of 70° C. to 100° C. and a humidity of 70% to 90% for 50 to 100 hours.

In Mathematical Formula 2, the average transmittance is a value measured for an optical film having a thickness of 20 μm or more and 250 μm or less, and the specific measurement method is not particularly limited, but for example, it can be measured using a spectrophotometer such as Shimadzu's SolidSpec-3700.

Specifically, the optical film may have an average transmittance change rate calculated by Mathematical Formula 2, of 10% or less, 5% or less, 4.7% or less, 0.01% or more, 0.1% or more, 0.5% or more, or 0.01% or more 10% or less, 0.01% or more 5% or less, 0.01% or more 4.7% or less, 0.1% or more 10% or less, 0.1% or more 5% or less, 0.1% or more 4.7% or less, 0.5% or more and 10% or less, 0.5% or more and 5% or less, 0.5% or more and 4.7% or less.

As the average transmittance change rate calculated by Mathematical Formula 2 is 10% or less, it is possible to provide an optical film that has excellent moisture resistance and thus does not deteriorate light absorption performance to near infrared ray in the wavelength range of 750 nm to 1500 nm even under severe conditions, realizes excellent light absorption and thus is suitable for application to Augmented Reality (AR), and the like.

In Mathematical Formula 2, the initial average transmittance may mean an optical film that has not been separately treated after manufacture.

That is, in Mathematical Formula 2, the initial average transmittance (T0) possessed by the optical film in a wavelength range of 800 nm to 1000 nm may be 30% or more, 40% or more, 45% or more, 60% or less, 58% or less, 30% or more and 60% or less, 40% or more and 60% or less, 45% or more and 60% or less, 30% or more and 58% or less, 40% or more and 58% or less, 45% or more and 58% or less.

As the initial average transmittance of the optical film is 30% or more and 60% or less, it is possible to provide an optical film that has excellent light absorption to near infrared ray in the wavelength range of 750 nm or more and 1500 nm or less, and thus is suitable for application to Augmented Reality (AR), and the like.

In Mathematical Formula 2, the average transmittance (T2) possessed by the optical film in a wavelength range of 800 nm to 1000 nm after exposure to high temperature and high humidity conditions may mean an average transmittance in the wavelength region of 800 nm or more and 1000 nm or less, which is measured after evaluating the optical film of the one embodiment under the conditions of 85° C. and 85% for 72 hours. At this time, a maximum light intensity of 0.10 to 1.00 W/cm$^2$ or 0.68 W/cm$^2$ of light intensity can be applied, and a QUV device (Q-Lab) can be used.

The coating layer can be formed from a composition for forming coating layer according to one embodiment described below.

The type of the substrate is not particularly limited, and those known in the related art can be used. For example, substrates such as glass, PET (polyethylene terephthalate), TAC (triacetyl cellulose), PC (polycarbonate), and COP (cyclo-olefin polymer) can be used.

As the optical film of the embodiment includes a dye having a maximum absorption wavelength of 750 nm or more and 1500 nm or less together with the vinyl cyan compound-aromatic compound copolymer in the coating layer, the vinyl cyan compound-aromatic compound copolymer has excellent oxidative stability against heat and light and thus, generates less reactive species that affect the stability of the dye, and thus increases the stability of the dye, so that the film has excellent light resistance and moisture resistance even when used under severe conditions, and can realize excellent light absorption property in a wavelength range of 750 nm or more and 1500 nm or less.

The coating layer of the one embodiment may include a vinyl cyan compound-aromatic vinyl compound copolymer.

In the case of including the vinyl cyan compound-aromatic vinyl compound copolymer, it can realize excellent light resistance as compared to the case of including a UV-curable polymer resin such as an acrylic resin, a heat-curable resin such as a urethane resin or an epoxy resin, or a thermoplastic resin such as an acrylic resin.

Specifically, the UV-curable polymer resin or the heat-curable resin has weak light resistance, and when used together with a dye having a maximum absorption wavelength of 750 nm or more and 1500 nm or less, the light absorption performance of the dye may be deteriorated.

As the coating layer of the embodiment includes a vinyl cyan compound-aromatic vinyl compound copolymer, the vinyl cyan compound-aromatic compound copolymer has excellent oxidative stability against heat and light and thus, can realize excellent light resistance and moisture resistance, which makes it possible to realize excellent light absorption performance of the dye even under severe conditions.

In the one embodiment, the vinyl cyan compound-aromatic vinyl compound copolymer may have a weight average molecular weight of 10,000 g/mol or more and 200,000 g/mol or less.

The "copolymer" may include random copolymers, block copolymers, and graft copolymers unless otherwise specified.

Specifically, the vinyl cyan compound-aromatic vinyl compound copolymer may have a weight average molecular weight of 10,000 g/mol or more, 50,000 g/mol or more, 80,000 g/mol or more, 100,000 g/mol or more, or 200,000 g/mol or less, 150,000 g/mol or less, 120,000 g/mol or less, or 10,000 g/mol or more and 200,000 g/mol or less, 10,000 g/mol or more and 150,000 g/mol or less, 10,000 g/mol or more and 120,000 g/mol or less, 50,000 g/mol or more and 200,000 g/mol or less, 50,000 g/mol or more and 150,000 g/mol or less, 50,000 g/mol or more and 120,000 g/mol or less, 80,000 g/mol or more and 200,000 g/mol or less, 80,000 g/mol or more and 150,000 g/mol or less, 80,000 g/mol or more and 120,000 g/mol or less, 100,000 g/mol or more and 200,000 g/mol or less, 100,000 g/mol or more and 150,000 g/mol or less, 100,000 g/mol or more and 120,000 g/mol or less.

In the one embodiment, as the vinyl cyan compound-aromatic vinyl compound copolymer has a weight average molecular weight of 10,000 g/mol or more and 200,000 g/mol or less, the leveling and wetting properties are excellent due to the fluidity during formation of the coating solution, which can thus form a uniform coating film and, at the same time, realize excellent light resistant property.

When the weight average molecular weight of the vinyl cyan compound-aromatic vinyl compound copolymer is greater than 200,000 g/mol, the viscosity of the coating solution becomes high, which makes it impossible to form a uniform coating. When the weight average molecular weight is less than 10,000 g/mol, there may be a problem that the heat resistant stability of the resin is decreased and the light resistant properties are deteriorated.

In the one embodiment, the vinyl cyan compound-aromatic vinyl compound copolymer may contain 10 parts by weight or more and 50 parts by weight or less of the repeating unit derived from the vinyl cyan compound based on 100 parts by weight of the vinyl cyan compound-aromatic vinyl compound copolymer.

The vinyl cyan compound-aromatic vinyl compound copolymer may be a copolymer containing a vinyl cyan compound and an aromatic vinyl compound as monomers, and may further include additional monomers in addition to the vinyl cyan compound and the aromatic vinyl compound.

The copolymer may include a random copolymer, a block copolymer, and a graft copolymer.

As the weight ratio between the monomers used in the preparation of the vinyl cyan compound-aromatic vinyl compound copolymer is adjusted, the content of the repeating unit derived from the vinyl cyan compound contained in the vinyl cyan compound-aromatic vinyl compound copolymer can be adjusted.

Specifically, the vinyl cyan compound-aromatic vinyl compound copolymer may contain the repeating unit derived from the vinyl cyan compound in an amount of 10 parts by weight or more, 15 parts by weight or more, 17 parts by weight or more, 50 parts by weight or less, 40 parts by weight or less, 30 parts by weight or less, or 10 parts by weight or more and 50 parts by weight or less, 10 parts by weight or more and 40 parts by weight or less, 10 parts by weight or more and 30 parts by weight or less, 15 parts by weight or more and 50 parts by weight or less, 15 parts by weight or more and 40 parts by weight or less, 15 parts by weight or more and 30 parts by weight or less, 17 parts by weight or more and 50 parts by weight or less, 17 parts by weight or more and 40 parts by weight or less, 17 parts by weight or more and 30 parts by weight or less, based on 100 parts by weight of the vinyl cyan compound-aromatic vinyl compound copolymer.

That is, based on 100 parts by weight of the entire monomers used in the preparation of the vinyl cyan compound-aromatic vinyl compound copolymer, the vinyl cyanide compound may be contained in an amount of 10 parts by weight or more, 15 parts by weight or more, 17 parts by weight or more, 50 parts by weight or less, 40 parts by weight or less, 30 parts by weight or less, or 10 parts by weight or more and 50 parts by weight or less, 10 parts by weight or more and 40 parts by weight or less, 10 parts by weight or more and 30 parts by weight or less, 15 parts by weight or more and 50 parts by weight or less, 15 parts by weight or more and 40 parts by weight or less, 15 parts by weight or more and 30 parts by weight or less, 17 parts by weight or more and 50 parts by weight or less, 17 parts by weight or more and 40 parts by weight or less, 17 parts by weight or more and 30 parts by weight or less.

As the vinyl cyan compound-aromatic vinyl compound copolymer contains 10 parts by weight or more and 50 parts by weight or less of the repeating unit derived from the vinyl cyan compound based on 100 parts by weight of the vinyl cyan compound-aromatic vinyl compound copolymer, the light stability and gas permeability of the vinyl cyan compound-aromatic vinyl compound copolymer are improved, so that excellent light resistant stability and heat resistant stability can be realized.

When the vinyl cyan compound-aromatic vinyl compound copolymer contains the repeating unit derived from the vinyl cyan compound in an amount of less than 10 parts by weight based on 100 parts by weight of the vinyl cyan compound-aromatic vinyl compound copolymer, the light stability and gas permeability of the vinyl cyan compound-aromatic vinyl compound copolymer may be lowered, and the light resistant stability may be deteriorated. When the content is greater than 50 parts by weight, the stability due to heat is lowered, and heat resistant stability may be deteriorated.

Meanwhile, in the one embodiment, the vinyl cyan compound-aromatic vinyl compound copolymer may contain 50 parts by weight or more and 90 parts by weight or less of the repeating unit derived from the vinyl cyan compound based on 100 parts by weight of the vinyl cyan compound-aromatic vinyl compound copolymer.

As the weight ratio between the monomers used in the preparation of the vinyl cyan compound-aromatic vinyl compound copolymer is adjusted, it is possible to adjust the content of the repeating unit derived from the aromatic vinyl compound contained in the vinyl cyan compound-aromatic vinyl compound copolymer.

Specifically, the vinyl cyan compound-aromatic vinyl compound copolymer may contain the repeating unit derived from the aromatic vinyl compound in an amount of 50 parts by weight or more, 60 parts by weight or more, 70 parts by weight or more, 90 parts by weight or less, 85 parts by weight or less, 83 parts by weight or less, or 50 parts by weight or more and 90 parts by weight or less, 50 parts by weight or more and 85 parts by weight or less, 50 parts by weight or more and 83 parts by weight or less, 60 parts by weight or more and 90 parts by weight or less, 60 parts by weight or more and 85 parts by weight or less, 60 parts by weight or more and 83 parts by weight or less, 70 parts by weight or more and 90 parts by weight or less, 70 parts by weight or more and 85 parts by weight or less, 70 parts by weight or more and 83 parts by weight or less, based on 100 parts by weight of the vinyl cyan compound-aromatic vinyl compound copolymer.

That is, based on 100 parts by weight of the total monomers used in the preparation of the vinyl cyan compound-aromatic vinyl compound copolymer, the aromatic vinyl compound may be contained in an amount of 50 parts by weight or more, 60 parts by weight or more, 70 parts by weight or more, 90 parts by weight or less, 85 parts by weight or less, 83 parts by weight or less, or 50 parts by weight or more and 90 parts by weight or less, 50 parts by weight or more and 85 parts by weight or less, 50 parts by weight or more and 83 parts by weight or less, 60 parts by weight or more and 90 parts by weight or less, 60 parts by weight or more and 85 parts by weight or less, 60 parts by weight or more and 83 parts by weight or less, 70 parts by weight or more and 90 parts by weight or less, 70 parts by weight or more and 85 parts by weight or less, 70 parts by weight or more and 83 parts by weight or less.

As the vinyl cyan compound-aromatic vinyl compound copolymer contains 50 parts by weight or more and 90 parts by weight or less of the repeating unit derived from the aromatic vinyl compound based on 100 parts by weight of the vinyl cyan compound-aromatic vinyl compound copolymer, good thermal stability and excellent mechanical properties of the vinyl cyan compound-aromatic vinyl compound copolymer are realized, so that the finally manufactured optical film can not only realize excellent heat resistant stability but also realize good scratch resistance.

When the vinyl cyan compound-aromatic vinyl compound copolymer contains the repeating unit derived from the aromatic vinyl compound in an amount of less than 50 parts by weight based on 100 parts by weight of the vinyl cyan compound-aromatic vinyl compound copolymer, the stability due to heat is poor, and light resistant or heat resistant stability may be deteriorated. When the content is greater than 90 parts by weight, the light stability and gas permeability of the vinyl cyan compound-aromatic vinyl compound copolymer may deteriorate, which may cause deterioration of the light resistant stability.

Further, the vinyl cyan compound-aromatic vinyl compound copolymer may contain 110 parts by weight or more and 500 parts by weight or less of the repeating unit derived from the aromatic vinyl compound based on 100 parts by weight of the repeating unit derived from the vinyl cyan compound.

Specifically, the vinyl cyan compound-aromatic vinyl compound copolymer may contain the repeating unit derived from the aromatic vinyl compound in an amount of 110 parts by weight or more, 150 parts by weight or more, 200 parts by weight or more, 500 parts by weight or less, 450 parts by weight or less, 110 parts by weight or more and 500 parts by weight or less, 150 parts by weight or more and 500 parts by weight or less, 200 parts by weight or more and 500 parts by weight or less, 110 parts by weight or more and 450 parts by weight or less, 150 parts by weight or more and 450 parts by weight or less, 200 parts by weight or more and 450 parts by weight or less, based on 100 parts by weight of the repeating unit derived from the vinyl cyan compound.

The vinyl cyan compound is not particularly limited, but examples thereof include one or more compounds selected from the group consisting of acrylonitrile, metanitrolonitrile, ethylacrylonitrile and isopropylacrylonitrile. For example, the vinyl cyan compound may include acrylonitrile.

Further, the aromatic vinyl compound is not particularly limited, but for example, it may include one or more compounds selected from the group consisting of styrene, α-methylstyrene, m-methylstyrene, p-methylstyrene and p-tert-butylstyrene. For example, the aromatic vinyl compound may include styrene or α-methylstyrene.

Meanwhile, the coating layer of the one embodiment may further include a polymer resin other than the vinyl cyan compound-aromatic vinyl compound copolymer.

The coating layer may include 90 parts by weight or more of the vinyl cyan compound-aromatic vinyl compound copolymer based on total 100 parts by weight of the entire polymer resin contained in the coating layer.

Specifically, the coating layer may contain the vinyl cyan compound-aromatic vinyl compound copolymer in an amount of 90 parts by weight or more, 95 parts by weight or more, 99 parts by weight or more, 99.9 parts by weight or more, 100 parts by weight or less, or 90 parts by weight or more and 100 parts by weight or less, 95 parts by weight or more and 100 parts by weight or less, 99 parts by weight or more and 100 parts by weight or less, 99.9 parts by weight or more and 100 parts by weight or less, based on total 100 parts by weight of the entire polymer resin contained in the coating layer. For example, the coating layer may include only the vinyl cyan compound-aromatic vinyl compound copolymer as a polymer resin.

As the coating layer contains the vinyl cyan compound-aromatic vinyl compound copolymer in an amount of 90 parts by weight or more based on total 100 parts by weight of the entire polymer resin contained in the coating layer, excellent light resistance and moisture resistance can be realized, which allows the dye to have excellent oxidative stability against heat and light even under severe conditions, and generate almost no reactive species that affect the stability of the dye, thus realizing excellent light absorption performance.

When the coating layer contains the vinyl cyan compound-aromatic vinyl compound copolymer in an amount of less than 90 parts by weight based on total 100 parts by weight of the entire polymer resin contained in the coating layer, the light absorption performance of the dye is deteriorated, and the finally manufactured optical film is inferior in moisture resistance and light resistance, and thus may have inferior light absorption performance under severe conditions.

In the one embodiment, the coating layer may include a dye having a maximum absorption wavelength of 750 nm or more and 1500 nm or less.

As the coating layer includes a dye having a maximum absorption wavelength of 750 nm or more and 1500 nm or less, it is possible to provide an optical film that has excellent absorbance to near infrared ray in a wavelength region of 750 nm or more and 1500 nm or less, and thus is suitable for application to Augmented Reality (AR), and the like.

The type of a dye having a maximum absorption wavelength of 750 nm or more and 1500 nm or less is not particularly limited, and can be appropriately selected and used from compounds known to be capable of performing the functions. Dyes that can be used may include, for example, sulfonium derivative of ceramidonine, new methylene blue, thioerythrosine triethylammonium, 6-acetylamino-2-methylceramidonin, eosin, erythrosine, rose bengal, thionine, basic yellow, Pinacyanol chloride, Rhodamine 6G, Gallocyanine, ethyl violet, Victoria blue R, Celestine blue, Quinaldine Red, Crystal Violet, Brilliant Green, Astrazon orange G, Darrow Red, Pyronin Y, Basic Red 29, pyrylium iodide, Safranin O, Cyanine, Methylene Blue, Azure A, or a combination of two or more thereof.

Specifically, the dye having a maximum absorption wavelength of 750 nm or more and 1500 nm or less may include a cyanine-based dye.

In the one embodiment, the coating layer may include 0.1 parts by weight or more and 3 parts by weight or less of the dye having a maximum absorption wavelength of 750 nm or more and 1500 nm or less based on total 100 parts by weight of the vinyl cyan compound-aromatic vinyl compound copolymer.

Specifically, the coating layer may contain the dye having a maximum absorption wavelength of 750 nm or more and 1500 nm or less in an amount of 0.1 parts by weight or more, 0.5 parts by weight or more, 3 parts by weight or less, 2 parts by weight or less, 1 parts by weight or less or 0.1 parts by weight or more 3 parts by weight or less, 0.1 parts by weight or more and 2 parts by weight or less, 0.1 parts by weight or more and 1 parts by weight or less, 0.5 parts by weight or more and 3 parts by weight or less, 0.5 parts by weight or more and 2 parts by weight or less, 0.5 parts by weight or more and 1 parts by weight or less, based on total 100 parts by weight of the vinyl cyan compound-aromatic vinyl compound copolymer.

As the coating layer contains the dye having a maximum absorption wavelength of 750 nm or more and 1500 nm or less in an amount of 0.1 part by weight or more and 3 parts by weight or less based on total 100 parts by weight of the vinyl cyan compound-aromatic vinyl compound copolymer, it can absorb light in the range of 750 nm or more and 1500 nm flowing in from the external environment to improve the eye tracking performance of AR/VR devices.

When the coating layer contains the dye having a maximum absorption wavelength of 750 nm or more and 1500 nm or less in an amount of less than 0.1 part by weight based on total 100 parts by weight of the vinyl cyan compound-aromatic vinyl compound copolymer, the light cannot be sufficiently absorbed, which may cause a decrease in eye tracking performance. When the content is greater than 3 parts by weight, there is a problem that the visible light transmittance is lowered, the color value of the optical film is increased, and the optical properties are deteriorated.

Further, in the one illustrative embodiment, the coating layer may further include other additives. Other additives that can be used include, for example, an anti-foaming agent.

In one illustrative embodiment, a silicone-based reactive additive can be used as the anti-foaming agent, and a commercially available product such as Tego Rad 2500 can be used.

The content of the additives, for example, the anti-foaming agent or the plasticizer, can be appropriately adjusted to a level that does not interfere with the function of the optical film.

The coating layer may include 5 to 50 parts by weight of the other additives based on 100 parts by weight of the vinyl cyan compound-aromatic compound copolymer. Specifically, the lower limit of the content of the other additives may be, for example, 10 parts by weight or more, 15 parts by weight or more, 20 parts by weight or more, 25 parts by weight or more, 30 parts by weight or more, 35 parts by weight or more, 40 parts by weight or more or 45 parts by weight or more, and the upper limit may be, for example, 45 parts by weight or less, 40 parts by weight or less, 35 parts by weight or less, 30 parts by weight or less, 25 parts by weight or less, 20 parts by weight or less, 15 parts by weight or less or 10 parts by weight or less. When the content satisfies the above range, the effect due to the use of the additive can be appropriately secured without interfering with properties required for the coating layer.

Specifically, an example of a method for manufacturing the optical film of the one embodiment is not particularly limited, and for example, a manufacturing method comprising a step of applying the composition for forming coating layer to a substrate to form a coating film (step 1); and a step of drying the coating film (Step 2) can be used.

Step 1 is a step of applying the above-mentioned composition for forming coating layer to a substrate to form a coating film. The method of applying the composition for forming coating layer to a substrate is not particularly limited.

As set forth above, the composition for forming a coating film may include an organic solvent. The composition for forming coating layer may include a solid content in an amount enough to have an appropriate viscosity in consideration of processability such as coating properties during the film forming process. For example, the composition for forming coating layer may include a solvent such that the concentration of the total solid content of the components contained in the composition is 1 to 70% by weight. Specifically, the solvent may include a solvent such that the concentration of the total solid content of the components included in the composition is 2% by weight or more, 5% by weight or more, 10% by weight or more or 20% by weight or more, and 65% by weight or less, 60% by weight or less, 55% by weight or less or 50% by weight or less.

Further, the composition for forming coating layer may further include other components in addition to the organic solvent as described above. Non-limiting examples includes additives that can improve film thickness uniformity or surface smoothness, improve adhesion to a substrate, change dielectric constant or conductivity, or increase density. Examples of such additives may include surfactants, silane-based compounds, dielectric or cross-linkable compounds, and the like.

Step 2 is a step of applying the composition for forming coating layer to a substrate and drying the formed coating film.

The drying step of the coating film may be performed by a heating means such as a hot plate, a hot air circulation furnace, an infrared furnace, and may be carried out at a temperature of 50° C. or more and 150° C. or less, or 50° C. or more and 100° C. or less.

The thickness of the optical film of the one embodiment is not particularly limited, but for example, it can be freely adjusted within the range of 0.01 μm or more and 1000 μm or less. When the thickness of the optical film increases or decreases by a specific value, the physical properties measured for the optical film may also change by a certain numerical value.

In the one embodiment, the thickness of the coating layer is not particularly limited, but for example, it can be freely adjusted within the range of 0.005 µm or more and 1000 µm or less. More specifically, the thickness of the coating layer may be 0.005 µm or more, 0.01 µm or more, 0.1 µm or more, 1 µm or more, 3 µm or more, or 1000 µm or less, 20 µm or less, 15 µm or less, or 0.01 µm or more 1000 µm or less, 0.01 µm or more and 20 µm or less, 0.01 µm or more and 15 µm or less, 0.0 µm or more and 1000 µm or less, 0.1 µm or more and 20 µm or less, 0.1 µm or more and 15 µm or less, 1 µm or more and 1000 µm or less, 1 µm or more and 20 µm or less, 1 µm or more and 15 µm or less, 3 µm or more and 1000 µm or less, 3 µm or more and 20 µm or less, 3 µm or more and 15 µm or less. When the thickness of the coating layer increases or decreases by a specific value, the physical properties measured for the optical film may also change by a certain numerical value.

The thickness of the substrate is also not particularly limited, and may be, for example, in the range of 0.01 µm or more and 1000 µm or less, or 1 µm or more, 3 µm or more, or 1000 µm or less, 500 µm or less, or 100 µm or less.

Meanwhile, the optical film may have an average transmittance at a wavelength of 400 nm or more and 500 nm or less of 85% or more and 95% or less.

The average transmittance is a value measured for an optical film having a thickness of 20 µm or more and 250 µm or less, and the specific measurement method is not particularly limited, and for example, it can be measured using a spectrophotometer such as Shimadzu's SolidSpec-3700.

Specifically, the optical film may have an average transmittance at a wavelength of 400 nm or more and 500 nm or less, of 85% or more, 89% or more, 95% or less, 90% or less, 85% or more and 95% or less, 85% or more and 90% or less, 89% or more and 95% or less, 89% or more and 90% or less.

As the optical film has an average transmittance at a wavelength of 400 nm or more and 500 nm or less of 85% or more and 95% or less, it is possible to realize excellent visibility.

The dye having a maximum absorption wavelength of 750 nm or more and 1500 nm or less have poor stability against light. Thus, conventionally, in the case of an optical film including the same, there is a problem that the light resistance is deteriorated and the light absorption performance of the dye is deteriorated.

Therefore, the present inventors have conducted research on an optical film that has excellent light resistance and moisture resistance even when used under severe conditions, and that can realize excellent light absorption in a wavelength range of 750 nm or more and 1500 nm or less, and found that in the case of an optical film including a dye having a maximum absorption wavelength of 750 nm or more and 1500 nm or less together with the vinyl cyan compound-aromatic compound copolymer, the vinyl cyan compound-aromatic compound copolymer has excellent oxidative stability against heat and light and thus, generates less reactive species that affect the stability of the dye, so that by increasing the stability of the dye, the finally manufactured optical film has excellent light resistance and moisture resistance even when used under severe conditions, and can realize excellent light absorption in a wavelength range of 750 nm or more and 1500 nm or less. The present disclosure has been completed on the basis of this finding.

Meanwhile, the optical film may further include a metal oxide layer formed on the other surface of the substrate.

Further, the metal oxide layer may comprise an oxide of any one metal selected from the group consisting of indium, zinc, tin, aluminum, gallium, thallium, titanium, zirconium, hafnium, cesium, antimony, vanadium, niobium, tantalum, silicon and germanium, or a composite oxide of two or more metals selected from the above metals.

For example, the metal oxide layer may include one or more metal oxides selected from the group consisting of indium tin oxide (ITO), indium zinc oxide (IZO), zinc tin oxide (ZTO), aluminum-doped zinc oxide (AZO), gallium-doped zinc oxide (GZO), and antimony-doped tin oxide (ATO).

The method for forming a metal oxide layer is not particularly limited, and for example, film forming methods using a dry process such as sputtering, vacuum deposition, CVD (Chemical Vapor Deposition), or electron beam deposition method can be applied.

The thickness of the metal oxide layer is not particularly limited, and can be controlled to an appropriate thickness in consideration of desired durability or adhesion. For example, the thickness of each metal oxide layer can be controlled within a range of about 1 nm to 100 nm, or about 3 nm to 45 nm. In one example, the thickness of the metal oxide layer may be about 40 nm or less, about 35 nm or less, about 30 nm or less, about 25 nm or less, or about 20 nm or less.

Meanwhile, the optical film of the embodiment may include an adhesive layer formed on the coating layer. That is, the optical film of the embodiment may include a laminated structure in which a metal oxide layer, a substrate, a coating layer, and an adhesive layer are laminated in this order.

The adhesive layer is a layer that is applied between the layers of the optical film and cured to adhere the layers to each other, and either an optically clear adhesive (OCA) or an optically clear resin (OCR) can be used.

Meanwhile, the optical film of the embodiment may further include a metal oxide layer and a substrate on the other surface of the adhesive layer. That is, the optical film of the embodiment may include a laminated structure in which a metal oxide layer, a substrate, a coating layer, an adhesive layer, a substrate, and a metal oxide layer are stacked in this order. In the optical film, each metal oxide layer and each substrate may each independently be the same or different.

Further, the optical film of the embodiment may further include a cover member on the other surface of the adhesive layer. That is, the optical film of the above embodiment may include a laminated structure in which a metal oxide layer, a substrate, a coating layer, an adhesive layer, and a cover member are laminated in this order.

Further, the optical film of the embodiment may further include other layers between or above and below the laminated structure illustrated above. Even in such a case, the optical film has excellent light resistance and moisture resistance, and thus can realize excellent light absorption performance even when exposed to severe conditions.

The cover member may be made of plastic material, metal material, or glass material.

According to another embodiment of the disclosure, there can be provided a composition for forming coating layer, comprising: a vinyl cyan compound-aromatic compound copolymer, and a dye having a maximum absorption wavelength of 750 nm or more and 1500 nm or less, wherein the vinyl cyan compound-aromatic vinyl compound copolymer has a weight average molecular weight of 10,000 g/mol or more and 200,000 g/mol or less, and wherein the vinyl cyan compound-aromatic vinyl compound copolymer contains 10 parts by weight or more and 50 parts by weight or less of a repeating unit derived from the vinyl cyan compound based on 100 parts by weight of the vinyl cyan compound-aromatic vinyl compound copolymer.

The coating layer of the optical film of one embodiment described above may be formed from the composition for forming coating layer. The details concerning the vinyl cyan compound-aromatic compound copolymer and the dye having a maximum absorption wavelength of 750 nm or more and 1500 nm or less include all the contents described above.

The composition for forming coating layer of the one embodiment may include a vinyl cyan compound-aromatic vinyl compound copolymer.

In the case of including the vinyl cyan compound-aromatic vinyl compound copolymer, it is possible to realize excellent light resistance as compared to the case of including a UV curable polymer resin such as an acrylate resin or an epoxy resin or a heat curable resin such as a urethane resin or an epoxy resin.

Specifically, the UV-curable polymer resin or the heat-curable resin has weak light resistance, and when used together with a dye having a maximum absorption wavelength of 750 nm or more and 1500 nm or less, the light absorption performance of the dye may be deteriorated.

As the composition for forming coating layer of the embodiment includes a vinyl cyan compound-aromatic vinyl compound copolymer, the vinyl cyan compound-aromatic compound copolymer has excellent oxidative stability against heat and light and thus, can realize excellent light resistance and moisture resistance, which makes it possible to achieve excellent light absorption performance of the dye even under severe conditions.

In the one embodiment, the vinyl cyan compound-aromatic vinyl compound copolymer may have a weight average molecular weight of 10,000 g/mol or more and 200,000 g/mol or less.

The "copolymer" may include random copolymers, block copolymers, and graft copolymers unless otherwise specified.

Specifically, the vinyl cyan compound-aromatic vinyl compound copolymer may have a weight average molecular weight of 10,000 g/mol or more, 50,000 g/mol or more, 80,000 g/mol or more, 100,000 g/mol or more, or 200,000 g/mol or less, 150,000 g/mol or less, 120,000 g/mol or less, or 10,000 g/mol or more and 200,000 g/mol or less, 10,000 g/mol or more and 150,000 g/mol or less, 10,000 g/mol or more and 120,000 g/mol or less, 50,000 g/mol or more and 200,000 g/mol or less, 50,000 g/mol or more and 150,000 g/mol or less, 50,000 g/mol or more and 120,000 g/mol or less, 80,000 g/mol or more and 200,000 g/mol or less, 80,000 g/mol or more and 150,000 g/mol or less, 80,000 g/mol or more and 120,000 g/mol or less, 100,000 g/mol or more and 200,000 g/mol or less, 100,000 g/mol or more and 150,000 g/mol or less, 100,000 g/mol or more and 120,000 g/mol or less.

In the one embodiment, as the vinyl cyan compound-aromatic vinyl compound copolymer has a weight average molecular weight of 10,000 g/mol or more and 200,000 g/mol or less, the leveling and wetting properties are excellent due to the fluidity during formation of the coating solution, which can thus form a uniform coating film and, at the same time, realize excellent light resistant property.

When the weight average molecular weight of the vinyl cyan compound-aromatic vinyl compound copolymer is greater than 200,000 g/mol, the viscosity of the coating solution becomes high, which makes it impossible to form a uniform coating. When the weight average molecular weight is less than 10,000 g/mol, there may be a problem that the heat resistant stability of the resin is lowered and the light resistant property is deteriorated.

In the one embodiment, the vinyl cyan compound-aromatic vinyl compound copolymer may contain 10 parts by weight or more and 50 parts by weight or less of the repeating unit derived from the vinyl cyan compound based on 100 parts by weight of the vinyl cyan compound-aromatic vinyl compound copolymer.

The vinyl cyan compound-aromatic vinyl compound copolymer may be a copolymer containing a vinyl cyan compound and an aromatic vinyl compound as monomers, and may further include additional monomers in addition to the vinyl cyan compound and the aromatic vinyl compound.

The copolymer may include a random copolymer, a block copolymer, and a graft copolymer.

As the weight ratio between the monomers used in the preparation of the vinyl cyan compound-aromatic vinyl compound copolymer is adjusted, it is possible to adjust the content of the repeating unit derived from the vinyl cyan compound contained in the vinyl cyan compound-aromatic vinyl compound copolymer.

Specifically, the vinyl cyan compound-aromatic vinyl compound copolymer may contain the repeating unit derived from the vinyl cyan compound in an amount of 10 parts by weight or more, 15 parts by weight or more, 17 parts by weight or more, 50 parts by weight or less, 40 parts by weight or less, 30 parts by weight or less, or 10 parts by weight or more and 50 parts by weight or less, 10 parts by weight or more and 40 parts by weight or less, 10 parts by weight or more and 30 parts by weight or less, 15 parts by weight or more and 50 parts by weight or less, 15 parts by weight or more and 40 parts by weight or less, 15 parts by weight or more and 30 parts by weight or less, 17 parts by weight or more and 50 parts by weight or less, 17 parts by weight or more and 40 parts by weight or less, 17 parts by weight or more and 30 parts by weight or less, based on 100 parts by weight of the vinyl cyan compound-aromatic vinyl compound copolymer.

That is, based on 100 parts by weight of the entire monomers used in the preparation of the vinyl cyan compound-aromatic vinyl compound copolymer, the vinyl cyanide compound may be contained in an amount of 10 parts by weight or more, 15 parts by weight or more, 17 parts by weight or more, 50 parts by weight or less, 40 parts by weight or less, 30 parts by weight or less, or 10 parts by weight or more and 50 parts by weight or less, 10 parts by weight or more and 40 parts by weight or less, 10 parts by weight or more and 30 parts by weight or less, 15 parts by weight or more and 50 parts by weight or less, 15 parts by weight or more and 40 parts by weight or less, 15 parts by weight or more and 30 parts by weight or less, 17 parts by weight or more and 50 parts by weight or less, 17 parts by weight or more and 40 parts by weight or less, 17 parts by weight or more and 30 parts by weight or less.

As the vinyl cyan compound-aromatic vinyl compound copolymer contains the repeating unit derived from the vinyl cyan compound in an amount of 10 parts by weight or more and 50 parts by weight or less based on 100 parts by weight of the vinyl cyan compound-aromatic vinyl compound copolymer, the light stability and gas permeability of the vinyl cyan compound-aromatic vinyl compound copolymer are improved, so that excellent light resistant stability and heat resistant stability can be realized.

When the vinyl cyan compound-aromatic vinyl compound copolymer contains the repeating unit derived from the vinyl cyan compound in an amount of less than 10 parts by weight based on 100 parts by weight of the vinyl cyan compound-aromatic vinyl compound copolymer, the light stability and gas permeability of the vinyl cyan compound-aromatic vinyl compound copolymer may be lowered, and the light resistant stability may be deteriorated. When the content is greater than 50 parts by weight, the stability due to heat is lowered, and heat resistant stability may be deteriorated.

Meanwhile, in the one embodiment, the vinyl cyan compound-aromatic vinyl compound copolymer may contain 50 parts by weight or more and 90 parts by weight or less of the repeating unit derived from the vinyl cyan compound based on 100 parts by weight of the vinyl cyan compound-aromatic vinyl compound copolymer.

As the weight ratio between the monomers used in the preparation of the vinyl cyan compound-aromatic vinyl compound copolymer is adjusted, it is possible to adjust the content of the repeating unit derived from the aromatic vinyl compound contained in the vinyl cyan compound-aromatic vinyl compound copolymer.

Specifically, the vinyl cyan compound-aromatic vinyl compound copolymer may contain the repeating unit derived from the aromatic vinyl compound in an amount of 50 parts by weight or more, 60 parts by weight or more, 70 parts by weight or more, 90 parts by weight or less, 85 parts by weight or less, 83 parts by weight or less, or 50 parts by weight or more and 90 parts by weight or less, 50 parts by weight or more and 85 parts by weight or less, 50 parts by weight or more and 83 parts by weight or less, 60 parts by weight or more and 90 parts by weight or less, 60 parts by weight or more and 85 parts by weight or less, 60 parts by weight or more and 83 parts by weight or less, 70 parts by weight or more and 90 parts by weight or less, 70 parts by weight or more and 85 parts by weight or less, 70 parts by weight or more and 83 parts by weight or less, based on 100 parts by weight of the vinyl cyan compound-aromatic vinyl compound copolymer.

That is, based on 100 parts by weight of the entire monomers used in the preparation of the vinyl cyan compound-aromatic vinyl compound copolymer, the aromatic vinyl compound may be contained in an amount of 50 parts by weight or more, 60 parts by weight or more, 70 parts by weight or more, 90 parts by weight or less, 85 parts by weight or less, 83 parts by weight or less, or 50 parts by weight or more and 90 parts by weight or less, 50 parts by weight or more and 85 parts by weight or less, 50 parts by weight or more and 83 parts by weight or less, 60 parts by weight or more and 90 parts by weight or less, 60 parts by weight or more and 85 parts by weight or less, 60 parts by weight or more and 83 parts by weight or less, 70 parts by weight or more and 90 parts by weight or less, 70 parts by weight or more and 85 parts by weight or less, 70 parts by weight or more and 83 parts by weight or less.

As the vinyl cyan compound-aromatic vinyl compound copolymer contains the repeating unit derived from the aromatic vinyl compound in an amount of 50 parts by weight or more and 90 parts by weight or less based on 100 parts by weight of the vinyl cyan compound-aromatic vinyl compound copolymer, good thermal stability and excellent mechanical properties of the vinyl cyan compound-aromatic vinyl compound copolymer are realized, so that the finally manufactured optical film can not only realize excellent heat resistant stability but also realize good scratch resistance.

When the vinyl cyan compound-aromatic vinyl compound copolymer contains the repeating unit derived from the aromatic vinyl compound in an amount of less than 50 parts by weight based on 100 parts by weight of the vinyl cyan compound-aromatic vinyl compound copolymer, the stability due to heat is poor, and light resistant or heat resistant stability may be deteriorated. When the content is greater than 90 parts by weight, the light stability and gas permeability of the vinyl cyan compound-aromatic vinyl compound copolymer may deteriorate, which may cause deterioration of the light resistant stability.

Further, the vinyl cyan compound-aromatic vinyl compound copolymer may contain 110 parts by weight or more and 500 parts by weight or less of the repeating unit derived from the aromatic vinyl compound based on 100 parts by weight of the repeating unit derived from the vinyl cyan compound.

Specifically, the vinyl cyan compound-aromatic vinyl compound copolymer may contain the repeating unit derived from the aromatic vinyl compound in an amount of 110 parts by weight or more, 150 parts by weight or more, 200 parts by weight or more, 500 parts by weight or less, 450 parts by weight or less, 110 parts by weight or more and 500 parts by weight or less, 150 parts by weight or more and 500 parts by weight or less, 200 parts by weight or more and 500 parts by weight or less, 110 parts by weight or more and 450 parts by weight or less, 150 parts by weight or more and 450 parts by weight or less, 200 parts by weight or more and 450 parts by weight or less, based on 100 parts by weight of the repeating unit derived from the vinyl cyan compound.

As the vinyl cyan compound-aromatic vinyl compound copolymer contains the repeating unit derived from the aromatic vinyl compound in an amount of 110 parts by weight or more and 500 parts by weight or less based on 100 parts by weight of the repeating unit derived from the vinyl cyan compound, good thermal stability and excellent mechanical properties of the vinyl cyan compound-aromatic vinyl compound copolymer are realized, so that the finally manufactured optical film can not only realize excellent heat resistant stability but also realize good scratch resistance.

When the vinyl cyan compound-aromatic vinyl compound copolymer contains the repeating unit derived from the aromatic vinyl compound in an amount of less than 110 parts by weight based on 100 parts by weight of the repeating unit derived from the vinyl cyan compound, the stability due to heat is poor, and light resistant or heat resistant stability may be deteriorated. When the content is greater than 500 parts by weight, the light stability and gas permeability of the vinyl cyan compound-aromatic vinyl compound copolymer may deteriorate, which may cause deterioration of the light resistant stability.

The vinyl cyan compound is not particularly limited, but examples thereof include one or more compounds selected from the group consisting of acrylonitrile, metanitrolonitrile, ethylacrylonitrile and isopropylacrylonitrile. For example, the vinyl cyan compound may include acrylonitrile.

Further, the aromatic vinyl compound is not particularly limited, but examples thereof include one or more compounds selected from the group consisting of styrene, α-methylstyrene, m-methylstyrene, p-methylstyrene and p-tert-butylstyrene. For example, the aromatic vinyl compound may include styrene or α-methylstyrene.

Meanwhile, the composition for forming coating layer of the one embodiment may further include a polymer resin other than the vinyl cyan compound-aromatic vinyl compound copolymer.

The composition for forming coating layer may include 90 parts by weight or more of the vinyl cyan compound-aromatic vinyl compound copolymer based on total 100 parts by weight of the entire polymer resin contained in the coating layer.

Specifically, the composition for forming coating layer may contain the vinyl cyan compound-aromatic vinyl compound copolymer in an amount of 90 parts by weight or more, 95 parts by weight or more, 99 parts by weight or more, 99.9 parts by weight or more, 100 parts by weight or less, or 90 parts by weight or more and 100 parts by weight or less, 95 parts by weight or more and 100 parts by weight or less, 99 parts by weight or more and 100 parts by weight or less, 99.9 parts by weight or more and 100 parts by weight or less, based on total 100 parts by weight of the entire polymer resin contained in the coating layer. For example, the composition for forming coating layer may include only the vinyl cyan compound-aromatic vinyl compound copolymer as a polymer resin.

As the composition for forming coating layer contains the vinyl cyan compound-aromatic vinyl compound copolymer in an amount of 90 parts by weight or more based on total 100 parts by weight of the entire polymer resin contained in the composition for forming coating layer, it is possible to realize excellent light resistance and moisture resistance, which allows the dye to have excellent oxidative stability against heat and light even under severe conditions, and generate almost no reactive species that affect the stability of the dye, thus realizing excellent light absorption performance.

When the composition for forming coating layer contains the vinyl cyan compound-aromatic vinyl compound copolymer in an amount of less than 90 parts by weight based on total 100 parts by weight of the entire polymer resin contained in the composition for forming coating layer, the light absorption performance of the dye is deteriorated, so that the finally manufactured optical film is inferior in moisture resistance and light resistance, and thus may have inferior light absorption performance under severe conditions.

In the one embodiment, the composition for forming coating layer may include 10 parts by weight or more and 30 parts by weight or less of the vinyl cyan compound-aromatic vinyl compound copolymer based on total 100 parts by weight of the composition for forming coating layer.

Specifically, the composition for forming coating layer may contain the vinyl cyan compound-aromatic vinyl compound copolymer in an amount of 10 parts by weight or more, 12 parts by weight or more, 30 parts by weight or less, 20 parts by weight or less, 15 parts by weight or less or 10 parts by weight or more 30 parts by weight or less, 12 parts by weight or more and 30 parts by weight or less, 10 parts by weight or more and 20 parts by weight or less, 12 parts by weight or more and 20 parts by weight or less, 10 parts by weight or more and 15 parts by weight or less, 12 parts by weight or more and 15 parts by weight or less, based on total 100 parts by weight of the coating layer forming composition.

In the one embodiment, the composition for forming coating layer may include a dye having a maximum absorption wavelength of 750 nm or more and 1500 nm or less.

As the composition for forming coating layer includes a dye having a maximum absorption wavelength of 750 nm or more and 1500 nm or less, it is possible to provide an optical film that has excellent absorbance to near infrared ray in a wavelength region of 750 nm or more and 1500 nm or less, and thus is suitable for application to Augmented Reality (AR), and the like.

The type of a dye having a maximum absorption wavelength of 750 nm or more and 1500 nm or less is not particularly limited, and can be appropriately selected and used from compounds known to be capable of performing the functions. Dyes that can be used may include, for example, sulfonium derivative of ceramidonine, new methylene blue, thioerythrosine triethylammonium, 6-acetylamino-2-methylceramidonin, eosin, erythrosine, rose bengal, thionine, basic yellow, Pinacyanol chloride, Rhodamine 6G, Gallocyanine, ethyl violet, Victoria blue R, Celestine blue, Quinaldine Red, Crystal Violet, Brilliant Green, Astrazon orange G, Darrow Red, Pyronin Y, Basic Red 29, pyrylium iodide, Safranin O, Cyanine, Methylene Blue, Azure A, or a combination of two or more thereof.

Specifically, the dye having a maximum absorption wavelength of 750 nm or more and 1500 nm or less may include a cyanine-based dye.

In the one embodiment, the composition for forming coating layer may include 0.1 parts by weight or more and 3 parts by weight or less of the dye having a maximum absorption wavelength of 750 nm or more and 1500 nm or less based on total 100 parts by weight of the vinyl cyan compound-aromatic vinyl compound copolymer.

Specifically, the composition for forming coating layer may contain the dye having a maximum absorption wavelength of 750 nm or more and 1500 nm or less in an amount of 0.1 parts by weight or more, 0.5 parts by weight or more, 3 parts by weight or less, 2 parts by weight or less, 1 parts by weight or less or 0.1 parts by weight or more 3 parts by weight or less, 0.1 parts by weight or more and 2 parts by weight or less, 0.1 parts by weight or more and 1 parts by weight or less, 0.5 parts by weight or more and 3 parts by weight or less, 0.5 parts by weight or more and 2 parts by weight or less, 0.5 parts by weight or more and 1 parts by weight or less, based on total 100 parts by weight of the vinyl cyan compound-aromatic vinyl compound copolymer.

As the composition for forming coating layer contains the dye having a maximum absorption wavelength of 750 nm or more and 1500 nm or less in an amount of 0.1 part by weight or more and 3 parts by weight or less based on total 100 parts by weight of the vinyl cyan compound-aromatic vinyl compound copolymer, it is possible to absorb light in the range of 750 nm or more and 1500 nm flowing in from the external environment to improve the eye tracking performance of AR/VR devices.

When the composition for forming coating layer contains the dye having a maximum absorption wavelength of 750 nm or more and 1500 nm or less in an amount of less than 0.1 part by weight based on total 100 parts by weight of the vinyl cyan compound-aromatic vinyl compound copolymer, the light cannot be sufficiently absorbed, which may cause a decrease in eye tracking performance. When the content is more than 3 parts by weight, there is a problem that the visible light transmittance is lowered, the color value of the optical film is increased, and the optical properties are deteriorated.

Meanwhile, the composition for forming coating layer may further comprise a solvent.

The solvent may be an organic solvent. Non-limiting examples of the organic solvent include ketones, alcohols, acetates, ethers, and mixtures of two or more thereof.

Specific examples of such organic solvent include ketones such as methyl ethyl ketone, methyl isobutyl ketone, acetylacetone or isobutyl ketone; alcohols such as methanol, ethanol, n-propanol, i-propanol, n-butanol, i-butanol or t-butanol: acetates such as ethyl acetate, i-propyl acetate, or polyethylene glycol monomethyl ether acetate; ethers such as tetrahydrofuran or propylene glycol monomethyl ether; or a mixture of two or more thereof.

The organic solvent can be added at the time of mixing the respective components contained in the composition for forming coating layer, or can be contained in the composition for forming coating layer while adding the respective components in a state of being dispersed or mixed in an organic solvent.

For example, the composition for forming coating layer can include an organic solvent such that the total solid content concentration of the components contained in the composition is 1% to 70% by weight. Specifically, the solvent can include a solvent such that the total solid content concentration of the components contained in the composition is 2% by weight or more, 5% by weight or more, 10% by weight or more or 20% by weight or more, and 65% by weight or less, 60% by weight or less, 55% by weight or less or 50% by weight or less. When the content of the solvent in the composition is too low, the fluidity of the composition can be lowered, resulting in the occurrence of defects such as the occurrence of striped patterns on the finally manufactured film. In addition, when the solvent is added in an excess amount, the solid content is lowered, and the coating and film formation are not sufficient, so that the physical properties and surface characteristics of the optical film can be deteriorated and defects can occur during the drying and curing process.

Further, in the one illustrative embodiment, the coating layer may further include other additives. Other additives that can be used include, for example, an anti-foaming agent.

In one illustrative embodiment, a silicone-based reactive additive can be used as the anti-foaming agent, and a commercially available product such as Tego Rad 2500 can be used.

The content of the additives, for example, the anti-foaming agent or the plasticizer, can be appropriately adjusted to a level that does not interfere with the function of the optical film.

The composition for forming coating layer may include the other additives in an amount of 5 to 50 parts by weight based on 100 parts by weight of the vinyl cyan compound-aromatic compound copolymer. Specifically, the lower limit of the content of the other additives may be, for example, 10 parts by weight or more, 15 parts by weight or more, 20 parts by weight or more, 25 parts by weight or more, 30 parts by weight or more, 35 parts by weight or more, 40 parts by weight or more or 45 parts by weight or more, and the upper limit may be, for example, 45 parts by weight or less, 40 parts by weight or less, 35 parts by weight or less, 30 parts by weight or less, 25 parts by weight or less, 20 parts by weight or less, 15 parts by weight or less or 10 parts by weight or less. When the content satisfies the above range, the effects due to the use of the additive can be appropriately secured without interfering with properties required for the coating layer.

Meanwhile, according to yet another embodiment of the disclosure, there can be provided an electronic device comprising the above-mentioned optical film.

The details concerning the optical film includes all the contents described above.

The electronic device may comprise a camera device unit acquiring an iris image; a light source in an infrared region; and an optical film that blocks external light different from the wavelength band of the light source in the infrared region.

The optical film can block external light different from the wavelength band of the light source in an infrared region and mainly transmit only light in a near infrared band projected onto an infrared region.

Thus, according to the optical film, the influence of the external light source can be minimized by blocking the near-infrared region of the specific band of the external light source.

Applications of the electronic device is not particularly limited. For example, it can be used in applications that are highly likely to be exposed to high temperature/high humidity conditions, specifically, in smart devices such as mobile devices, a component of a wearable display, automobile parts (e.g., head up display), and the like. More specifically, the electronic device may be suitable for application to Augmented Reality (AR).

Advantageous Effects

An optical film, a composition for forming coating layer, and an electronic device, which have excellent light absorption performance to near infrared ray at a wavelength of 750 nm or more and 1500 nm or less, and are excellent in light resistance and moisture resistance, thereby capable of realizing excellent light absorption performance even when exposed to severe conditions, can be provided.

The invention is described in more detail with reference to examples. However, the following examples are provided for illustrative purposes only, and are not intended to limit the scope of the present disclosure.

Examples 1 to 3 and Comparative Examples 1 to 4

Example 1

12.5 g of vinyl cyan compound-aromatic compound copolymer having a weight average molecular weight of 120,000 g/mol (manufacturer: LG Chem, Styrene-Acrylonitrile, Content of vinyl cyanide compound-derived repeating unit: 17 wt. %), 0.12 g of dye (NIR absorbing cyanine-based dye having a maximum absorption wavelength of 865 nm), and 50 g of methyl ethyl ketone (MEK) and 37.5 g of toluene as solvents were added, and the mixture was stirred with a Paste mixer for about 30 minutes while blocking light to prepare a coating solution.

The coating solution was coated onto a TAC substrate having a thickness of 60 μm using a Meyer bar, and dried at 90° C. within 2 minutes to manufacture an optical film having a final thickness of 65 μm including a coating layer having a thickness of 5 μm.

Example 2

A coating solution and an optical film having a final thickness of 65 μm were manufactured in the same manner as in Example 1, except that 0.073 g of NIR absorbing dye (cyanine dye) having a maximum absorption wavelength of 930 nm was used instead of NIR absorption dye (cyanine dye) having a maximum absorption wavelength of 865 nm.

Example 3

A coating solution and an optical film having a final thickness of 65 μm were manufactured in the same manner as in Example 1, except that 12.5 g of a vinyl cyan compound-aromatic compound copolymer having a weight average molecular weight of 110,000 g/mol (manufacturer: LG Chem) was used instead of a vinyl cyan compound-aromatic compound copolymer having a weight average molecular weight of 120,000 g/mol.

Comparative Example 1

A coating solution and an optical film having a final thickness of 65 μm were manufactured in the same manner as in Example 1, except that 12.5 g of poly(methyl methacrylate) (PMMA), weight average molecular weight: 100,000 g/mol, manufacturer: LG Chem) was used instead of a vinyl cyan compound-aromatic compound copolymer having a weight average molecular weight of 120,000 g/mol.

Comparative Example 2

25 g of pentaerythritol triacrylate (manufacturer: SK Entis) and 25 g of hexafunctional acrylate (product name: EB1290, manufacturer: SK Entis) were added, 0.5 g of dye (NIR absorbing dye having a maximum absorption wavelength of 865 nm), 2.5 g of a photopolymerization initiator (Irgacure 184) and 50 g of methyl ethyl ketone (MEK) as a solvent were added, and the mixture was stirred with a Paste mixer for about 30 minutes while blocking light to prepare a coating solution.

The coating solution was coated onto a TAC substrate having a thickness of 60 μm using a Meyer bar, dried at 60° C. within 2 minutes, and then cured with a light intensity of 200 mJ/cm² using a mercury lamp to manufacture an optical film having a final thickness of 65 μm including a coating layer having a thickness of 5 μm.

Comparative Example 3

A coating solution and an optical film having a final thickness of 65 μm were manufactured in the same manner as in Example 1, except that 12.5 g of polystyrene (PS, weight average molecular weight: 250,000 g/mol, manufacturer: LG Chem) was used instead of a vinyl cyan compound-aromatic compound copolymer having a weight average molecular weight of 120,000 g/mol.

Comparative Example 4

A coating solution and an optical film having a final thickness of 65 μm were manufactured in the same manner as in Example 1, except that 0.44 g of NIR absorbing dye (cyanine-based dye) having a maximum absorption wavelength of 930 nm was used instead of a NIR absorbing dye having a maximum absorption wavelength of 865 nm.

Experimental Example

1. Thickness

For the optical films manufactured in Examples and Comparative Examples, the thickness of the entire optical film was measured using a digital micrometer (TESA, product name: μ-HITE).

2. Transmittance

For the optical films manufactured in Examples and Comparative Examples, the average transmittance at a wavelength of 400 nm to 500 nm and the average transmittance at a wavelength of 800 nm to 1000 nm were measured using Shimadzu's SolidSpec-3700.

In addition, the maximum light transmittance in a specific wavelength range of 750 nm or more and 1500 nm or less was measured.

3. Light Resistance

For the optical films manufactured in Examples and Comparative Examples, the average transmittance after exposure to QUV device (Q-Lab) for 15 hours or more and 30 hours or less was measured. After the optical film of the embodiment was evaluated using a QUV device (Q-Lab) under the condition of a maximum light intensity of 0.68 W/cm² at 340 nm for 24 hours, the average transmittance at a wavelength of 800 nm to 1000 nm was measured by the transmittance measurement method described above, and the average transmittance change rate before and after the light resistance test was measured by the following Mathematical Formula.

Average transmittance change rate=Average transmittance at a wavelength of 800 nm or more and 1000 nm or less after exposure to an ultraviolet ray at 340 nm wavelength for 24 hours in QUV device (Q-Lab)/Average transmittance at an initial wavelengths of 800 nm or more and 1000 nm or less*100.    [Mathematical Formula 1]

4. Moisture and Heat Resistant Reliability

After the optical films manufactured in Examples and Comparative Examples were exposed under the conditions of 85° C. and 85% for 72 hours in a constant temperature and humidity chamber (Jeiotech), the average transmittance at a wavelength of 800 nm to 1000 nm was measured by the transmittance measurement method described above, and the average transmittance change rate before and after the moisture resistance test was measured by the following Mathematical Formula.

Average transmittance change rate=(Average transmittance at a wavelength of 800 nm or more and 1000 nm or less after exposure to a temperature of 85° C. and humidity of 85% for 72 hours−Average transmittance at an initial wavelength of 800 nm or more and 1000 nm or less)/Average transmittance at an initial wavelength of 800 nm or more and 1000 nm or less*100    [Mathematical Formula 2]

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Maximum absorption wavelength (nm) | 865 | 930 | 865 | 865 | 865 | 865 | 930 |
| Average transmittance (%) @400 nm~500 nm | 89.2 | 89.3 | 89.1 | 89.3 | 91.2 | 89.3 | 85.2 |
| Average transmittance (%) @800 nm to 1000 nm | 47.2 | 55.3 | 46.9 | 47.5 | 75.2 | 47.1 | 25.3 |

TABLE 1-continued

| | Example 1 | Example 2 | Example 3 | Comparative Example 1 | Comparative Example 2 | Comparative Example 3 | Comparative Example 4 |
|---|---|---|---|---|---|---|---|
| Average transmittance after light resistance test (%) @ 800 nm to 1000 nm | 48.1 | 55.7 | 48.2 | 61.2 | 89.2 | 53.2 | 28.2 |
| Average transmittance change rate after light resistance test (%) @ 800 nm to 1000 nm | 1.90 | 0.72 | 2.77 | 28.84 | 18.62 | 12.95 | 11.46 |
| Average transmittance after moisture resistance test (%) @ 800 nm to 1000 nm | 49.4 | 57.4 | 48.3 | 51.7 | 82.3 | 48.9 | 27.4 |
| Average transmittance change rate after moisture resistance test (%) @ 800 nm to 1000 nm | 4.66 | 3.80 | 2.99 | 8.84 | 9.44 | 3.82 | 8.30 |

Examples 4 to 6 and Comparative Examples 5 to 8

Example 4

12.5 g of vinyl cyan compound-aromatic compound copolymer (weight average molecular weight: 120,000 g/mol, manufacturer: LG Chem), 0.12 g of dye (NIR absorbing dye having a maximum absorption wavelength of 865 nm), and 50 g of methyl ethyl ketone (MEK) and 37.5 g of toluene as solvents were added, and the mixture was stirred with a Paste mixer for about 30 minutes while blocking light to prepare a coating solution.

The coating solution was coated onto the other surface of a PET substrate on which indium-tin composite oxide (ITO) layer was formed using a Meyer bar, and dried at 90° C. within 2 minutes to form a coating layer having a thickness of 5 μm. A 25 μm film type OCA was laminated on the coating layer to form an adhesive layer.

A PET substrate having an indium-tin composite oxide (ITO) layer formed thereon is adhered to the adhesive layer, such that the adhesive layer and the PET substrate of the PET substrate having an indium-tin composite oxide (ITO) layer [thickness: 150 nm] formed thereon were in contact with each other. Thereby, an optical film having a total thickness of 131 μm was produced.

Example 5

An optical film having a total thickness of 180 μm was manufactured in the same manner as in Example 1, except that 100 μm thick Glass (manufacturer: Schott) was adhered onto the adhesive layer.

Example 6

An optical film having a total thickness of 130 μm was manufactured in the same manner as in Example 1, except that 0.073 g of NIR absorbing dye having a maximum absorption wavelength of 930 nm was used instead of NIR absorbing dye having a maximum absorption wavelength of 865 nm.

Comparative Example 5

A coating solution and an optical film having a final thickness of 131 μm were manufactured in the same manner as in Example 1, except that 12.5 g of poly(methyl methacrylate) (PMMA, weight average molecular weight: 100,000 g/mol, manufacturer: LG Chem) was used instead of vinyl cyan compound-aromatic compound copolymer.

Comparative Example 6

25 g of pentaerythritol triacrylate (manufacturer: SK Entis) and 25 g of hexafunctional acrylate (product name: EB1290, manufacturer: SK Entis) were added, and 0.5 g of dye (NIR absorbing dye having a maximum absorption wavelength of 865 nm), 2.5 g of a photopolymerization initiator (Irgacure 184) and 50 g of methyl ethyl ketone (MEK) as a solvent were added, and the mixture was stirred with a Paste mixer for about 30 minutes while blocking light to prepare a coating solution.

The coating solution was coated onto a 60 μm thick TAC substrate using a Meyer bar, dried at 60° C. within 2 minutes, and then cured with a light intensity of 200 mJ/cm$^2$ using a mercury lamp to manufacture an optical film having a final thickness of 131 μm including a coating layer having a thickness of 5 μm.

Experimental Example 5

1. Thickness

For the optical films manufactured in Examples 4 to 6 and Comparative Examples 5 to 6, the thickness of the entire optical film was measured using a digital micrometer.

2. Transmittance

For the optical films manufactured in Examples 4 to 6 and Comparative Examples 5 to 6, the average transmittance at a wavelength of 400 nm to 500 nm and the average transmittance at a wavelength of 800 nm to 1000 nm were measured using Shimadzu's SolidSpec-3700.

In addition, the maximum light transmittance in a specific wavelength range of 750 nm or more and 1500 nm or less was measured.

3. Light Resistance

After the optical films manufactured in Examples 4 to 6 and Comparative Examples 5 to 6 was evaluated using a Q-SUN device (Q LAB) under 1 SUN condition for 72 hours, the average transmittance at a wavelength of 800 nm to 1000 nm was measured by the transmittance measurement method described above, and the average transmittance change rate before and after the light resistance test was measured by the following Mathematical Formula.

Average transmittance change rate=(Average transmittance after exposure to Q-SUN device (Q LAB) for 72 hours or less under 1 SUN condition−Initial average transmittance)/ Initial average transmittance*100.  [Mathematical Formula 1]

TABLE 2

|  | Example 4 | Example 5 | Example 6 | Comparative Example 5 | Comparative Example 6 |
| --- | --- | --- | --- | --- | --- |
| Total thickness (μm) | 131 | 180 | 131 | 131 | 131 |
| Maximum absorption wavelength (nm) | 865 | 865 | 930 | 865 | 865 |
| Average transmittance (%) @400 nm~500 nm | 86.2 | 88.5 | 86.3 | 86.3 | 86.1 |
| Average transmittance (%) @800 nm to 1000 nm | 47.2 | 55.3 | 46.9 | 47.1 | 75.2 |
| Average transmittance after light resistance test (%) @800 nm to 1000 nm | 54.4 | 62.1 | 52.3 | 71.7 | 89.4 |
| Average transmittance change rate after light resistance test (%) @800 nm to 1000 nm | 15.25 | 12.30 | 11.51 | 52.23 | 18.88 |
| Average transmittance change volume after light resistance test (%) @800 nm to 1000 nm | 7.2 | 6.8 | 5.4 | 24.6 | 14.2 |

As shown in Tables 1 and 2 above, it was confirmed that the optical films of Examples were excellent in light absorption performance to near infrared ray at a wavelength of 750 nm or more and 1500 nm or less, have excellent light resistance and moisture-heat resistance reliability, and thus, realize excellent light absorption performance even when exposed to severe conditions.

On the other hand, it was confirmed that the optical films of Comparative Examples were poor in light resistance and/or moisture resistance.

The invention claimed is:

1. An optical film, comprising:

a substrate; and a coating layer formed on the substrate, wherein the coating layer comprises a vinyl cyan compound-aromatic compound copolymer and a dye having a maximum absorption wavelength of 750 nm or more and 1500 nm or less, wherein the optical film has an initial average transmittance (T0) of at least 30% in the wavelength range of 800 nm to 1000 nm, and wherein an average transmittance change rate 1 calculated by the following Mathematical Formula 1 is 18% or less:

Average transmittance change rate 1=[(Average transmittance(T1)possessed by the optical film in a wavelength range of 800 nm to 1000 nm after exposure to a wavelength range of 300 nm to 400 nm for 15 to 30 hours−the Initial average transmittance (T0)possessed by the optical film in a wavelength range of 800 nm to 1000 nm)/T0]*100.  [Mathematical Formula 1]

2. The optical film of claim 1, wherein:

an average transmittance change rate 2 calculated by the following Mathematical Formula 2 is 10% or less:

Average transmittance change rate 2=[(Average transmittance(T2)possessed by the optical film in a wavelength range of 800 nm to 1000 nm after exposure to high temperature and high humidity conditions−the Initial average transmittance(T0)possessed by the optical film in a wavelength range of 800 nm to 1000 nm)/T0]*100  [Mathematical Formula 2]

wherein, the exposure to high temperature and high humidity conditions means exposure to a temperature of 70° C. to 100° C. and a humidity of 70% to 90% for 50 to 100 hours.

3. The optical film of claim 1, wherein:

the vinyl cyan compound-aromatic vinyl compound copolymer has a weight average molecular weight of 10,000 g/mol or more and 200,000 g/mol or less.

4. The optical film of claim 1, wherein:
the vinyl cyan compound-aromatic vinyl compound copolymer contains 10 parts by weight or more and 50 parts by weight or less of a repeating unit derived from the vinyl cyan compound based on 100 parts by weight of the vinyl cyan compound-aromatic vinyl compound copolymer.

5. The optical film of claim 1, wherein:
the vinyl cyan compound-aromatic vinyl compound copolymer contains 110 parts by weight or more and 500 parts by weight or less of a repeating unit derived from the aromatic vinyl compound based on 100 parts by weight of the vinyl cyan compound-aromatic vinyl compound copolymer.

6. The optical film of claim 1, wherein:
the coating layer contains 0.1 parts by weight or more and 3 parts by weight or less of the dye having a maximum absorption wavelength of 750 nm or more and 1500 nm or less based on total 100 parts by weight of the vinyl cyan compound-aromatic vinyl compound copolymer.

7. The optical film of claim 1, wherein:
the dye having the maximum absorption wavelength of 750 nm or more and 1500 nm or less comprises a cyanine-based dye.

8. The optical film of claim 1, wherein:
a thickness of the coating layer is 0.005 μm or more and 1000 μm, and
a thickness of the optical film is 0.01 μm or more and 1000 μm.

9. The optical film of claim 1, further comprising:
a metal oxide layer formed on the other surface of the substrate.

10. The optical film of claim 1, wherein:
the average transmittance change rate 1 calculated by the Mathematical Formula 1 is 15% or less.

11. The optical film of claim 9, wherein:
the metal oxide layer comprises an oxide of any one metal selected from the group consisting of indium, zinc, tin, aluminum, gallium, thallium, titanium, zirconium, hafnium, cesium, antimony, vanadium, niobium, tantalum, silicon and germanium, or a composite oxide of two or more metals selected from the above metals.

12. The optical film of claim 9, wherein:
the metal oxide layer has a thickness of 1 nm to 100 nm.

13. An electronic device comprising the optical film of claim 1.

14. The electronic device of claim 13, wherein:
the electronic device comprises a camera device unit acquiring an iris image; a light source in an infrared region; and an optical film that blocks external light different from the wavelength band of the light source in the infrared region.

15. A composition for forming a coating layer, comprising:
a vinyl cyan compound-aromatic compound copolymer, and a dye having a maximum absorption wavelength of 750 nm or more and 1500 nm or less,
wherein the vinyl cyan compound-aromatic vinyl compound copolymer has a weight average molecular weight of 10,000 g/mol or more and 200,000 g/mol or less, and
wherein the vinyl cyan compound-aromatic vinyl compound copolymer contains 10 parts by weight or more and 50 parts by weight or less of a repeating unit derived from the vinyl cyan compound based on 100 parts by weight of the vinyl cyan compound-aromatic vinyl compound copolymer.

16. The composition for forming a coating layer of claim 15, wherein:
the composition for forming a coating layer contains 0.1 part by weight or more and 3 parts by weight or less of the dye having a maximum absorption wavelength of 750 nm or more and 1500 nm or less based on total 100 parts by weight of the vinyl cyan compound-aromatic vinyl compound copolymer.

17. The composition for forming a coating layer of claim 15, wherein:
the vinyl cyan compound-aromatic vinyl compound copolymer contains 110 parts by weight or more and 500 parts by weight or less of a repeating unit derived from the aromatic vinyl compound based on 100 parts by weight of the repeating unit derived from the vinyl cyan compound.

18. The composition for forming coating layer of claim 15, wherein:
the dye having the maximum absorption wavelength of 750 nm or more and 1500 nm or less comprises a cyanine-based dye.

19. The optical film of claim 9, wherein:
the average transmittance change rate 1 calculated by the Mathematical Formula 1 is 15% or less.

* * * * *